United States Patent [19]

Ardaud et al.

[11] Patent Number: 5,071,935
[45] Date of Patent: Dec. 10, 1991

[54] BORON/NITROGEN PRECERAMIC POLYMERS AND BORON NITRIDE CERAMIC MATERIALS PRODUCED THEREFROM

[75] Inventors: Pierre Ardaud, Sainte Foy Les Lyon; Gerard Mignani, Lyons, both of France

[73] Assignee: Rhone-Poulenc Chimie, Courbevoie, France

[21] Appl. No.: 418,193

[22] Filed: Oct. 6, 1989

[30] Foreign Application Priority Data

Oct. 6, 1988 [FR] France ............................ 88 13112

[51] Int. Cl.$^5$ ................................. C08G 77/56
[52] U.S. Cl. ............................. 528/5; 528/7; 501/92
[58] Field of Search ............................ 528/5, 7

[56] References Cited

U.S. PATENT DOCUMENTS 4,581,468  4/1986  Paciorek et al. ................. 556/403
4,939,222  7/1990  Mignani et al. ..................... 528/5

FOREIGN PATENT DOCUMENTS

0278734A2  8/1988  European Pat. Off. .
0310462A1  4/1989  European Pat. Off. .
0307259A1  3/3989  European Pat. Off. .
2163761A  5/1986  United Kingdom .

Primary Examiner—Melvyn I. Marquis
Attorney, Agent, or Firm—Burns, Doane, Swecker & Mathis

[57] ABSTRACT

Organometallic boron/nitrogen polymers, precursors of boron nitride, include recurring structural units of the formulae (I) and (II):

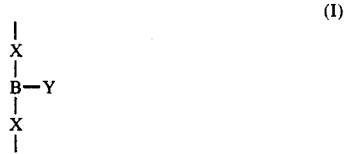

and

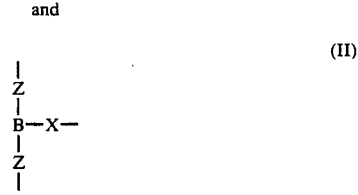

wherein X is $N-R^3$, Y is $NR^1R^2$ and Z is N-R, in which R, $R^1$, $R^2$ and $R^3$, which may be identical or different, are each a hydrogen atom, an optionally substituted hydrocarbon radical, or an organosilyl or hydrogenoorganosilyl radical and are prepared by reacting (a) at least one cyclic compound (compound A) containing recurring structural units of the formula (1):

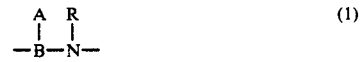

wherein A is a halogen atom and R is a hydrogen atom, an optionally substituted hydrocarbon radical, or an organosilyl or hydrogenoorganosilyl radical, with (b) at least one compound including at least one boron atom to which two halogen atoms are directly bonded (compound B), and (c) at least one compound containing at least one $NH_2$ group compound C); the resulting organometallic polymers are facilely pyrolyzed into boron nitride ceramic materials.

44 Claims, No Drawings

BORON/NITROGEN PRECERAMIC POLYMERS AND BORON NITRIDE CERAMIC MATERIALS PRODUCED THEREFROM

BACKGROUND OF THE INVENTION

1. Field of the Invention

The present invention relates to novel organometallic polymers based on boron and nitrogen and to a process for the synthesis of such novel polymers.

This invention also relates to the use of such novel organometallic polymers in the production of ceramic materials and shaped articles based on boron nitride, especially boron nitride in fibrous form.

The present invention lastly relates to novel intermediate compositions which are useful starting materials in the synthesis of the aforenoted novel organometallic polymers.

2. Description of the Prior Art

Boron nitride is increasingly in demand in this art in light of its high thermal stability, its impact strength, its great chemical inertness and its very good thermal conductivity. Furthermore, its low electrical conductivity makes it an insulating material of choice.

Several processes are presently known to the art for the preparation of boron nitride.

One such process includes reacting boron trichloride with ammonia in the gaseous state. A fine boron nitride powder is obtained in this manner, which may be sintered to produce solid shaped articles. However, the shaped articles thus produced exhibit a characteristic microporosity which may be highly detrimental for certain applications.

More recently, it was discovered that boron nitride could be produced by the pyrolysis of precursor polymers.

The advantage of this "polymer" method primarily resides in the form of the final product, and, more particularly, enables the production, after pyrolysis, of boron nitride fibers.

Thus, U.S. Pat. No. 4,581,468 describes a preceramic organoboron polymer prepared by the interaction of ammonia (ammonolysis) with a B-trichloro-N-tris(-trialkylsilyl)borazine (a cyclic compound) and which, as indicated, after drawing and pyrolysis at 970° C., results in the production of boron nitride fibers.

However, the beginning cyclic compound described in the patent is difficult to prepare and is thus expensive. Further, the maximum yield of such compound does not exceed 22% by weight, indicating actual yields appreciably lower than 22%. Consequently, it is not realistically suitable for applications on an industrial scale.

SUMMARY OF THE INVENTION

Accordingly, a major object of the present invention is the provision of a simple, efficient, economical and readily applicable improved process for the preparation of organometallic polymers based on boron and nitrogen in a wide variety of useful forms (filaments, fibers, molded shaped articles, coatings, foils, films, and the like), and which various forms are facilely converted in high yields by weight, upon pyrolysis, into useful materials based on boron nitride.

Briefly, it has now unexpectedly and surprisingly been determined that boron nitride can be prepared, in high yields by weight from precursor organometallic polymers based on boron and nitrogen, if such polymers are prepared by reacting:

(a) at least one cyclic compound (compound A) comprising recurring structural units of the formula (1):

wherein A is a halogen atom and R is a hydrogen atom, an optionally substituted hydrocarbon radical, or an organosilyl or hydrogenoorganosilyl radical; with (b) at least one compound comprising at least one boron atom to which two halogen atoms are directly bonded (compound B); and (c) at least one compound comprising at least one NH₂ group (compound C).

DETAILED DESCRIPTION OF THE PREFERRED EMBODIMENTS OF THE INVENTION

More particularly according to the present invention, the compounds C will hereinafter be designated aminolysis reagents generally (an amine compound containing at least one NH₂ group), and an ammonolysis reagent in the more particular case in which ammonia is used.

Consequently, the reaction products produced from the compounds A, B and C shall hereinafter be designated, respectively, aminolysates or ammonolysates, with the latter of course being included in the generic class of "aminolysates".

The aminolysates, as more fully explained below, constitute the novel polymers based on boron and nitrogen which circumscribe another object of the present invention.

The preparative process according to the invention essentially comprises a co-aminolysis of a mixture of at least one cyclic compound A and at least one compound B, as defined above.

This mixture to be aminolyzed circumscribes, as a novel and useful intermediate composition, yet another object of this invention.

Thus, it has surprisingly and unexpectedly now been discovered that such co-aminolysis of said mixture enables the production of polymers having a structure constituting a particularly crosslinked network which imparts a higher thermal stability during pyrolysis, thereby increasing the yield in boron nitride.

Furthermore, and this is an additional advantage of the process according to the invention relative to the processes of the prior art (U.S. Pat. No. 4,581,468), the fact that mixtures based on compound B as defined above, which are easy to prepare industrially and are thus less expensive, are used, makes it possible to substantially reduce the amount of the cyclic compounds to be used. This renders the process of the invention particularly economical.

The starting material cyclic compound A is advantageously a chlorine compound, but a fluorine, bromine or iodine compound may also be used.

This compound preferably has the following formula (1'):

wherein the radical R, as indicated above, is a hydrogen atom, an optionally substituted hydrocarbon radical, or an organosilyl or hydrogenoorganosilyl radical, and n is an integer ranging from 2 to 20, preferably equal to 3 or 4, and even more preferably is 3.

Particularly exemplary hydrocarbon radicals are the alkyl, cycloalkyl, aryl, alkylaryl and arylalkyl radicals, as well as the alkenyl and alkynyl radicals.

Representative such alkyl radicals include the methyl, ethyl, propyl, butyl, pentyl, hexyl, heptyl and octyl radicals. Representative cycloalkyl radicals include cyclopentyl, cyclohexyl and cycloheptyl radicals. Exemplary aryl radicals are phenyl and naphthyl. Exemplary alkylaryl radicals are tolyl and xylyl, and exemplary arylalkyl radicals are benzyl and phenylethyl.

Illustrative of the alkenyl radicals are the vinyl, allyl, butenyl and pentenyl radicals.

Illustrative alkynyl radicals are the ethynyl, propynyl and butynyl radicals.

Representative silyl radicals, more particularly the (trialkyl)silyl radicals, are the trimethyl-, triethyl-, tripropyl-, tributyl-, tripentyl-, trihexyl-, triheptyl- and trioctylsilyl radicals.

In a preferred embodiment of the invention, cyclic compounds A are used in which the radical R is a hydrogen atom or a hydrocarbon radical as described above, more particularly an alkyl radical.

In an even more preferred embodiment of the invention, the radical R is a hydrogen atom.

The cyclic compounds A as described above are well known to this art and may be prepared by any known means. They may be prepared, in particular, by the thermolysis, in xylene at reflux or in vapor phase, of compounds of the formula:

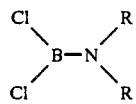

(wherein R is as defined above), utilizing methods described in the literature (for example, R.L. Wells, *Inorg. Chemistry*, 2, 29 (1963) and P. Gemayer, *Monatsh.*, 97, 429 (1966)). They may also be prepared by the action of $BCl_3$ on $NH_4Cl$ (*Inorganic Synthesis*, 10, 139–41).

The starting material compound B is, as aforesaid, typically a chlorine compound.

The compound B preferably has the following formula (2):

 (2)

in which Y is

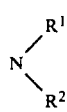

and the radicals $R^1$ and $R^2$, which may be identical or different, are each a hydrogen atom, an optionally substituted hydrocarbon radical, or an organosilyl or hydrogenoorganosilyl radical.

The preferred hydrocarbon radicals are the alkyl, cycloalkyl, aryl, alkylaryl and arylalkyl radicals, as well as the alkenyl and alkynyl radicals.

Exemplary such alkyl radicals include the methyl, ethyl, propyl, butyl, pentyl, hexyl, heptyl and octyl radicals. Illustrative cycloalkyl radicals are the cyclopentyl, cyclohexyl and cycloheptyl radicals. Exemplary aryl radicals are phenyl and naphthyl. Exemplary alkylaryl radicals are tolyl and xylyl, and exemplary arylalkyl radicals are benzyl and phenylethyl.

Particularly representative alkenyl radicals are the vinyl, allyl, butenyl and pentenyl radicals.

Lastly, representative alkynyl radicals include ethynyl, propynyl and butynyl.

In a preferred embodiment of the invention, the $R^1$ and $R^2$ radicals are organosilyl or hydrogenoorganosilyl radicals, and more particularly the (triorgano)silyl or (hydrogenodiorgano)silyl radicals. Even more preferably, $R^1$ and $R^2$ are selected from among trimethyl, triethyl, tripropyl, tributyl, tripentyl, trihexyl, triheptyl and trioctylsilyl radicals. The (trimethyl)silyl radicals are especially preferred.

The compounds of formula (2), described above, are well known to this art and may be prepared by any known means.

For example, in the case of alkyl type $R^1$ and $R^2$ radicals, see Wilberg and Schuster (*Zeitschrift fur Anorganische Chemie*, 213, 77 (1933)), Brown (*Journal of the American Chemical Society*, 74, 1219 (1952)), or Burg and Banus (*Journal of the American Chemical Society*, 76, 3903 (1954)).

Concerning the radicals $R^1$ and $R^2$ of triorganosilyl type, see Jenne and Niedzenzu (*Inorganic Chemistry*, 3, 68 (1964)), Sujishii and Witz (*Journal of the American Ceramic Society*, 79, 2447 (1957)), or Wannagat (*Angew. Chemie, Int. Ed.*, 3, 633 (1964)).

In general, the desired compound B may be prepared by the action of $BCl_3$ on

under suitable conditions of temperature and molar ratio.

Finally, concerning the aminolysis reagents (compound C) according to the present invention, exemplary are ammonia, the primary amines, the diamines (hydrazine, alkylhydrazine, hydrazide, alkylenediamine, etc.), the amides, the silylamines, and the like.

Preferably, compounds having the following formula (3) are used:

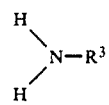 (3)

wherein the radical $R^3$ is a hydrogen atom, a hydrocarbon radical, or an organosilyl or hydrogenoorganosilyl radical. The following are particularly representative:

(i) ammonia ($R^3$ = hydrogen atom);

(ii) the primary organoamines ($R^3$ = alkyl, cycloalkyl, aryl, alkylaryl or arylalkyl radicals), such as, for example, methylamine, ethylamine, propylamine, butylamine, pentylamine, hexylamine, heptylamine and octylamine, cyclopropylamine, phenylamine, and the like;

(iii) silylamines and more particularly the triorganosilylamines, such as (trimethylsilyl)amine and (triethylsilyl)amine, or the hydrogenoorganosilylamines, such as (hydrogenodimethylsilyl)amine.

The preferred aminolysis reagents are the primary alkylamines and ammonia.

In an even more preferred embodiment of the invention, ammonia is used.

The general reaction scheme of the aminolysis in the reaction medium is the following:

$$\diagdown N-H + Cl-B\diagup \longrightarrow \diagdown N-B\diagup + HCl$$

The aminolysis reaction may be carried out in mass, or, preferably, in an organic solvent medium (hexane, pentane, toluene, etc.) and under anhydrous conditions.

The operation is typically carried out under atmospheric pressure, although lower or higher pressures are also within the ambit of this invention.

On the other hand, the aminolysis reactions are characteristically rather exothermic and it is thus preferred to operate at low temperatures.

The duration of the reaction, as a function of the amounts of the reagents introduced, may range from a few minutes to several hours.

The molar ratio in the initial mixture between the cyclic compound A and the compound B may vary greatly, whereby the flexibility and the field of application of the process according to the invention is extended. Generally, the higher the percentage of compound A in the mixture, the higher will be the pyrolytic yield in boron nitride of the polymer obtained upon completion of the reaction. In a preferred embodiment of the invention, the molar ratio [compound A]/[compound B] in the initial mixture is at least 1/10.

Upon completion of this stage of the reaction, the polymer is separated from the reaction medium, in particular from the ammonium chlorhydrate formed, by any known means, for example by filtration or by extraction and decantation, by means, in particular, of liquid ammonia.

The polymer recovered in this manner, following the optional elimination of the solvent and drying, constitutes the production.

If necessary, this polymer may be heat treated (thermolysis) in a later stage in order to further improve its pyrolysis behavior and thus its boron nitride weight yield. This later heat treatment, generally carried out at a temperature ranging from 100° to 200° C., preferably under ammonia, has the effect of modifying the internal structure of the polymer, probably by increasing the crosslinking thereof, which could explain its improved heat resistance.

In addition to the aforedescribed general preparative process, the invention also features novel organometallic polymers based on boron and nitrogen produced thereby, and which, upon pyrolysis thereof, result in the attainment of high yields by weight of boron nitride.

Thus, it has now also unexpectedly been determined that high yields by weight of boron nitride can be produced from a precursor polymer based on boron and nitrogen, said precursor polymer comprising the following structural units, per molecule:

(a) recurring structural units of formula (I):

$$\begin{array}{c} | \\ X \\ | \\ B-Y \\ | \\ X \\ | \end{array} \quad (I)$$

and (b) recurring structural units of formula (II):

$$\begin{array}{c} | \\ Z \\ | \\ B-X- \\ | \\ Z \\ | \end{array} \quad (II)$$

wherein X represents N-R³, Y represents $$N\diagup^{R^1}_{\diagdown R^2}$$

and Z represents N-R, in which the radicals R, R¹, R² and R³, which may be identical or different, are each a hydrogen atom, an optionally substituted hydrocarbon radical, or an organosilyl or hydrogenoorganosilyl radical.

It has now been discovered that such polymers based on boron and nitrogen, which have a matrix or network structure essentially comprising a combination of recurring units of formula (I) and recurring units of formula (II), as defined above, have an appreciably improved pyrolysis behavior relative to the precursors heretofore known. Consequently, it is thus possible to produce ceramic materials based o boron nitride in good yields by weight.

It will be appreciated that the polymers comprising all of the (I) and (II) units desired, i.e., all of the desired radicals R, R¹, R² and R³, can be prepared simply by reacting the compounds A, B and C as defined above, which contain the same radicals R, R¹, R² and R³.

More specifically, and without intending to limit the present invention to any particular theory, if the mixture contains:

$$\begin{array}{c} Cl\diagdown \quad \diagup R^1 \\ B-N \\ Cl\diagup \quad \diagdown R^2 \end{array}$$

(compound B) and a cyclic compound of the type:

$$\left[\begin{array}{cc} Cl & R \\ | & | \\ B & \!\!-\!\!\!-\!\! N \end{array}\right]_{\overline{n}}$$

(compound A), the co-aminolysis of this mixture by a compound of the type:

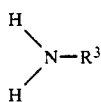
(compound C)

will, by conventional mechanisms, produce a polymer essentially comprising a random combination of recurring units of formula (I):

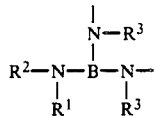
(I)

and recurring units of formula (III):

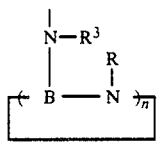
(III)

with the latter being merely a formal repetition of formula (II) as defined above.

Similarly, the ratio of the recurring units of formula (I) to those of formula (II) in the final polymer may be adjusted simply by employing an appropriate ratio between the compounds A and compounds B initially present in the reaction medium.

In a preferred embodiment of the invention, the polymer contains at least 10 mol % of recurring units of formula (II).

In general, it is observed that the higher the percentage of recurring units (II), the higher will be the boron nitride yield after pyrolysis.

Exemplary hydrocarbon and silyl radicals comprising the polymers according to the invention are those given above for the R, $R^1$, $R^2$ and $R^3$ radicals and the compounds A, B and C.

Consequently, the R, $R^1$, $R^2$ and $R^3$ radicals constituting the preferred polymers according to the invention are the following:

(i) R is a hydrogen atom or an alkyl radical; preferably, it is a hydrogen atom;

(ii) $R^1$ and $R^2$ are organosilyl radicals, preferably (triorgano)silyl radicals and more preferably (trialkyl)silyl radicals;

(iii) $R^3$ is a hydrogen atom or an alkyl radical; preferably $R^3$ is a hydrogen atom.

In a particularly preferred example of a polymer according to the invention, the recurring units (I) and (III) described above are of the following type (Me=CH$_3$):

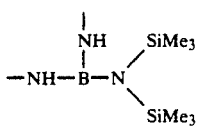
(I)

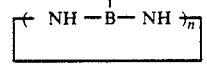
(III)

The polymers according to the invention have a number average molecular weight ranging from 500 to 10,000, preferably from 500 to 5,000.

They also have a weight average molecular weight ranging from 600 to 100,000, preferably from 1,000 to 10,000.

Depending on the molar ratio existing between the recurring units of formula (I) and those of formula (II), the polymers according to the invention may be present, at ambient temperature, in a form varying from a low or high viscosity oil to the solid state. In general, a high proportion of units of formula (II) corresponds to a polymer having a high molecular weight and thus a high viscosity.

The polymers according to the invention are soluble in most of the usual organic solvents (hexane, toluene, and the like), which may be quite advantageous relative to the forming thereof.

The polymers based on boron and nitrogen according to the invention are especially useful in the production of ceramic materials and shaped articles at least in part comprising boron nitride.

In the most general case (the production of ceramic powders), the polymer is pyrolyzed in an inert atmosphere, in a vacuum or preferably under ammonia, at a temperature ranging from 100° to 2,000° C. until the polymer is completely converted into boron nitride.

The polymer may also be formed prior to the pyrolysis, for example by molding or extrusion. If fibers are desired, the polymer is extruded by means of a conventional extruder (optionally after melting, if the polymer is initially in the solid state), then heat treated at a temperature of from 100° to 2,000° C., preferably under an ammonia atmosphere, to yield boron nitride fibers.

The resulting fibers may then be used, e.g., as a reinforcing material for composite materials of the ceramic/ceramic, ceramic/metal or ceramic/plastic type.

In order to further illustrate the present invention and the advantages thereof, the following specific examples are given, it being understood that same are intended only as illustrative and in nowise limitative.

EXAMPLE 1:

Into a 2 liter double-walled reactor, dried under nitrogen, 37.2 g (0.202 mole) of the cyclic compound:

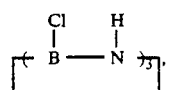

230 g (0.95 mole) of Cl$_2$B-N(SiMe$_3$)$_2$ (Me=CH$_3$), and 1,070 g toluene (solvent) were introduced.

The mixture was then cooled to −40° C. Ammonia was then introduced into the mixture for 5 hours, at a rate of 25 liter/hour.

The reaction was exothermic.

Following the addition, the mixture was maintained under agitation overnight and permitted to warm to ambient temperature, then filtered under nitrogen pressure.

The filtrate obtained in this manner was evaporated (elimination of the solvent) and 111 g of a white solid were recovered, constituting the precursor polymer according to the invention.

The isolated yield of the co-ammonolysis reaction was 56.4%.

The characteristics of the polymer obtained were the following:
$\overline{Mn} > 1000$ (number average molecular weight);
$\overline{Mw} > 2000$ (weight average molecular weight);
Residual Cl content: 0.73% by weight;
TGA (under helium at 850° C.)=34.3%.

EXAMPLE 2:

Into a 0.5 liter, double-walled reactor, dried under nitrogen, 4 g (0.022 mole) of the cyclic compound:

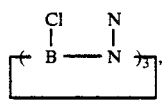

51.4 g (0.213 mole) of $Cl_2B-N(SiMe_3)_2$ (Me=$CH_3$) and 420 ml of toluene (solvent) were introduced.

The mixture was cooled to $-20°$ C., then ammonia was introduced at a rate of 30 l/h, over 1 h, 30 min.

The reaction was exothermic.

Following the addition, the mixture was maintained under agitation overnight and permitted to warm to ambient temperature, then filtered under nitrogen pressure.

The filtrate obtained in this manner was evaporated (elimination of solvent) and 29.3 g of a viscous liquid oil were recovered, constituting the precursor polymer of the invention.

The isolated yield of the co-ammonolysis reaction was 69.3%.

The characteristics of the polymer obtained were as follows:
$\overline{Mn} = 700$;
$\overline{Mw} = 1,210$;
IP = 1.72 (index of polydispersity);
Residual Cl content: <0.5% by weight;
TGA (under He at 850° C.) =24.6%.

EXAMPLE 3:

Into a 0.5 liter, double-walled reactor, dried under nitrogen, 10.6 g $(B(Cl)N(Me))_3$, or 0.047 mole, 115.3 g $Cl_2B-N(SiMe_3)_2$, or 0.475 mole, and 350 ml toluene (solvent) were introduced.

The mixture was cooled to $-10°$ C. and then ammonia was introduced into the mixture for 5 h, at a rate of 10 l/h.

The reaction was exothermic.

Following the addition, the mixture was maintained under agitation overnight, while being permitted to warm to ambient temperature, then filtered under nitrogen pressure.

The filtrate obtained in this manner was evaporated to 71.4 g to obtain a rather viscous liquid oil, constituting the precursor polymer according to the invention.

The isolated yield of the co-ammonolysis reaction was 75.1%.

The characteristics of the polymer obtained were as follows:

Glass transition temperature: $-1°$ C.;
Crosslinking temperature: 95° C.;
$\overline{Mn} = 690$;
$\overline{Mw} = 919$;
IP = 1.33 (index of polydispersity);
Residual Cl content: 0.085% by weight;
TGA (under He at 850° C.)= 12.95%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organometallic boron/nitrogen polymer comprising recurring structural units of the following formulae (I) and (II):

and

wherein X is n—$R^3$, Y is $NR^1R^2$, and Z is N-R which forms part of a cyclic structure, in which R, $R^1$, $R^2$ and $R^3$, which may be identical or different, are each a hydrogen atom, an optionally substituted hydrocarbon radical, or an organosilyl radical.

2. The boron/nitrogen polymer as defined by claim 1, wherein the molar ratio between the recurring units of formula (II) and the recurring units of formula (I) is at least 0.1.

3. The boron/nitrogen polymer as defined by claim 1, wherein R is an alkyl, cycloalkyl, aryl, alkylaryl, arylalkyl, alkenyl or alkynyl radical.

4. The boron/nitrogen polymer as defined by claim 3, wherein R is an alkyl radical.

5. The boron/nitrogen polymer as defined by claim 1, wherein R is a hydrogen atom.

6. The boron/nitrogen polymer as defined by claim 1, wherein $R^1$ and $R^2$ are each an organosilyl radical.

7. The boron/nitrogen polymer as defined by claim 6, wherein $R^1$ and $R^2$ are (triorgano)silyl radicals.

8. The boron/nitrogen polymer as defined by claim 7, wherein $R^1$ and $R^2$ are (trialkyl)silyl radicals.

9. The boron/nitrogen polymer as defined by claim 1, wherein $R^3$ is a hydrogen atom or an alkyl, cycloalkyl, aryl, alkylaryl or arylalkyl radical.

10. The boron/nitrogen polymer as defined by claim 9, wherein $R^3$ is a hydrogen atom or an alkyl radical.

11. The boron/nitrogen polymer as defined by claim 10, wherein $R^3$ is a hydrogen atom.

12. The boron/nitrogen polymer as defined by claim 1, having a number average molecular weight ranging from 500 to 10,000.

13. The boron/nitrogen polymer as defined by claim 12, having a number average molecular weight ranging from 500 to 5,000.

14. The boron/nitrogen polymer as defined by claim 12, having a weight average molecular weight ranging from 600 to 100,000.

15. The boron/nitrogen polymer as defined by claim 13, having a weight average molecular weight ranging from 1,000 to 10,000.

16. A process for the preparation of the organometallic boron/nitrogen polymer as defined by claim 1, which comprises reacting:
(a) at least one cyclic compound (compound A) comprising recurring structural units of the formula (1):

wherein A is a halogen atom and R is a hydrogen atom, an optionally substituted hydrocarbon radical, or an organosilyl or radical; with
(b) at least one compound comprising at least one boron atom to which two halogen atoms are directly bonded (compound B); and
(c) at least one compound comprising at least one NH$_2$ group (compound C).

17. The process as defined by claim 16, comprising carrying out the reaction in mass.

18. The process as defined by claim 16, comprising carrying out the reaction in solution, in an anhydrous organic solvent.

19. The process as defined by claim 16, wherein the molar ratio between compound A and compound B is at least 0.1.

20. The process as defined by claim 16, wherein A is a chlorine atom.

21. The process as defined by claim 16, wherein compound A has the following formula (1'):

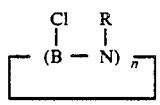

wherein D is an integer ranging from 2 to 20.

22. The process as defined by claim 21, wherein n is 3 or 4.

23. The process as defined by claim 16, wherein R is an alkyl, cycloalkyl, aryl, alkylaryl, arylalkyl, alkenyl or alkynyl radical.

24. The process as defined by claim 23, wherein R is an alkyl radical.

25. The process as defined by claim 16, wherein R is a hydrogen atom.

26. The process as defined by claim 16, wherein A is a chlorine atom.

27. The process as defined by claim 26, wherein compound B has the following formula (2):

in which Y is

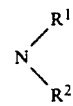

and the radicals R$^1$ and R$^2$, which may be identical or different, are each a hydrogen atom, an optionally substituted hydrocarbon radical, or an organosilyl radical.

28. The process as defined by claim 27, wherein R$^1$ and R$^2$, which may be identical or different, are each an organosilyl radical.

29. The process as defined by claim 28, wherein R$^1$ and R$^2$ are each a triorganosilyl or hydrogenoorganosilyl radical.

30. The process as defined by claim 29, wherein R$^1$ and R$^2$ are each a trialkylsilyl radical.

31. The process as defined by claim 16, wherein compound C has the following formula (3):

wherein R$^3$ is a hydrogen atom, an optionally substituted hydrocarbon radical, or an organosilyl radical.

32. The process as defined by claim 31, wherein R$^3$ is an alkyl, cycloalkyl, aryl, alkylaryl or arylalkyl radical.

33. The process as defined by claim 32, wherein R$^3$ is an alkyl radical.

34. The process as defined by claim 31, wherein R$^3$ is a hydrogen atom.

35. The process as defined by claim 16, further comprising heat treating the organometallic boron/nitrogen polymer thus produced.

36. The process as defined by claim 35, wherein said heat treating is carried out, in mass, at a temperature of from 100° to 200° C., under an ammonia atmosphere.

37. A composition of matter which comprises (a) at least one cyclic compound (compound A) comprising recurring structural units of the formula (1):

wherein A is a halogen atom and R is a hydrogen atom, an optionally substituted hydrocarbon radical, or an organosilyl radical; (b) at least one compound comprising at least one boron atom to which two halogen atoms are directly bonded (compound B); and (c) at least one compound comprising at least one NH$_2$ group (compound C).

38. A polymer according to claim 1, wherein said organosilyl radical is a hydrogenoorganosilyl radical.

39. A polymer according to claim 6, wherein at least one of the organosilyl radicals is a hydrogenoorganosilyl radical.

40. A process according to claim 16, wherein said organosilyl radical is a hydrogenoorganosilyl radical.

41. A process according to claim 27, wherein said organosilyl radical is a hydrogenoorganosilyl radical.

42. A process according to claim 28, wherein at least one of the organosilyl radicals is a hydrogenoorganosilyl radical.

43. A process according to claim 31, wherein said organosilyl radical is a hydrogenoorganosilyl radical.

44. A composition according to claim 37, wherein said organosilyl radical is a hydrogenoorganosilyl radical.

* * * * *